United States Patent
Brass et al.

(10) Patent No.: US 7,887,381 B2
(45) Date of Patent: Feb. 15, 2011

(54) ELECTRICALLY POWERED WATERCRAFT

(75) Inventors: Richard I. Brass, Friday Harbor, WA (US); Ryan Ellis, Los Angeles, CA (US)

(73) Assignee: Volt Boats, LLC, Friday Harbor, WA (US)

( * ) Notice: Subject to any disclaimer, the term of this patent is extended or adjusted under 35 U.S.C. 154(b) by 0 days.

(21) Appl. No.: 12/113,124

(22) Filed: Aug. 15, 2008

(65) Prior Publication Data

US 2008/0299842 A1 Dec. 4, 2008

Related U.S. Application Data

(60) Provisional application No. 60/915,074, filed on Apr. 30, 2007, provisional application No. 61/048,914, filed on Apr. 29, 2008.

(51) Int. Cl.
*B63H 20/08* (2006.01)

(52) U.S. Cl. .............................. 440/53; 114/347; 440/6

(58) Field of Classification Search ................ 114/347; 440/6, 53, 54, 7, 49
See application file for complete search history.

(56) References Cited

U.S. PATENT DOCUMENTS

| | | | |
|---|---|---|---|
| 1,840,949 A | | 1/1932 | Harvey |
| 1,911,192 A | * | 5/1933 | Harvey .................... 440/53 |
| 2,429,774 A | | 10/1947 | Schultz |
| 3,324,821 A | * | 6/1967 | Laughlin .................... 440/54 |
| 3,587,512 A | * | 6/1971 | Patterson .................... 440/54 |
| 3,685,481 A | * | 8/1972 | Mansell .................... 440/6 |
| 4,226,206 A | * | 10/1980 | Wilson .................... 440/53 |
| 4,529,386 A | * | 7/1985 | Smith .................... 440/54 |
| 4,668,195 A | * | 5/1987 | Smith .................... 440/6 |
| 4,734,066 A | * | 3/1988 | Burgess .................... 440/6 |
| 5,336,119 A | | 8/1994 | Lais et al. |
| 5,481,997 A | | 1/1996 | Arndt |
| 5,937,785 A | | 8/1999 | Murray, III |
| 6,210,242 B1 | | 4/2001 | Howard et al. |
| 6,280,267 B1 | * | 8/2001 | Griffith, Sr. et al. ........... 440/53 |
| 6,458,004 B2 | | 10/2002 | Van Breems |
| 6,478,639 B1 | | 11/2002 | Covell, III |
| 6,532,884 B2 | | 3/2003 | Profitt et al. |
| 6,736,084 B2 | * | 5/2004 | McDonough et al. ....... 114/347 |
| 6,855,016 B1 | | 2/2005 | Jansen |
| 7,032,531 B1 | | 4/2006 | Caples |
| 7,121,225 B1 | | 10/2006 | Caples |
| 7,458,542 B2 | * | 12/2008 | Chow et al. ............. 244/102 R |
| 2002/0195039 A1 | | 12/2002 | Anderson |
| 2004/0242088 A1 | * | 12/2004 | McCann ........................ 440/6 |
| 2004/0255836 A1 | | 12/2004 | Hopkins |

(Continued)

FOREIGN PATENT DOCUMENTS

WO PCT/US2008/062114 11/2008

*Primary Examiner*—Lars A Olson
(74) *Attorney, Agent, or Firm*—Jensen & Puntigam, P.S.

(57) ABSTRACT

Improvements to electrically powered watercraft including kayaks are disclosed. The watercraft comprises a hull defining a cavity and a battery powered retractable propulsion unit. The retractable propulsion unit can be retracted into the cavity with powered or unpowered means. Various retractable propulsion units are disclosed, including propulsion units that are steerable wherein the thrust can be selectively directed. Specific embodiments to improve the steerability of electrically powered watercraft are disclosed. Mechanisms for disengaging the steering controls from the retractable propulsion units are also disclosed. Locking mechanisms for locking the retractable propulsion unit in an extended or fully retracted position are also disclosed.

21 Claims, 9 Drawing Sheets

U.S. PATENT DOCUMENTS

| | | |
|---|---|---|
| 2005/0268833 A1 | 12/2005 | Conrad |
| 2006/0009092 A1 | 1/2006 | Krietzman |
| 2006/0254495 A1 | 11/2006 | Eckert |
| 2007/0012236 A1 | 1/2007 | Caples |
| 2007/0017431 A1 | 1/2007 | Hopkins |
| 2007/0125285 A1 | 6/2007 | Conrad |
| 2009/0042461 A1* | 2/2009 | Walton .......................... 440/6 |

* cited by examiner

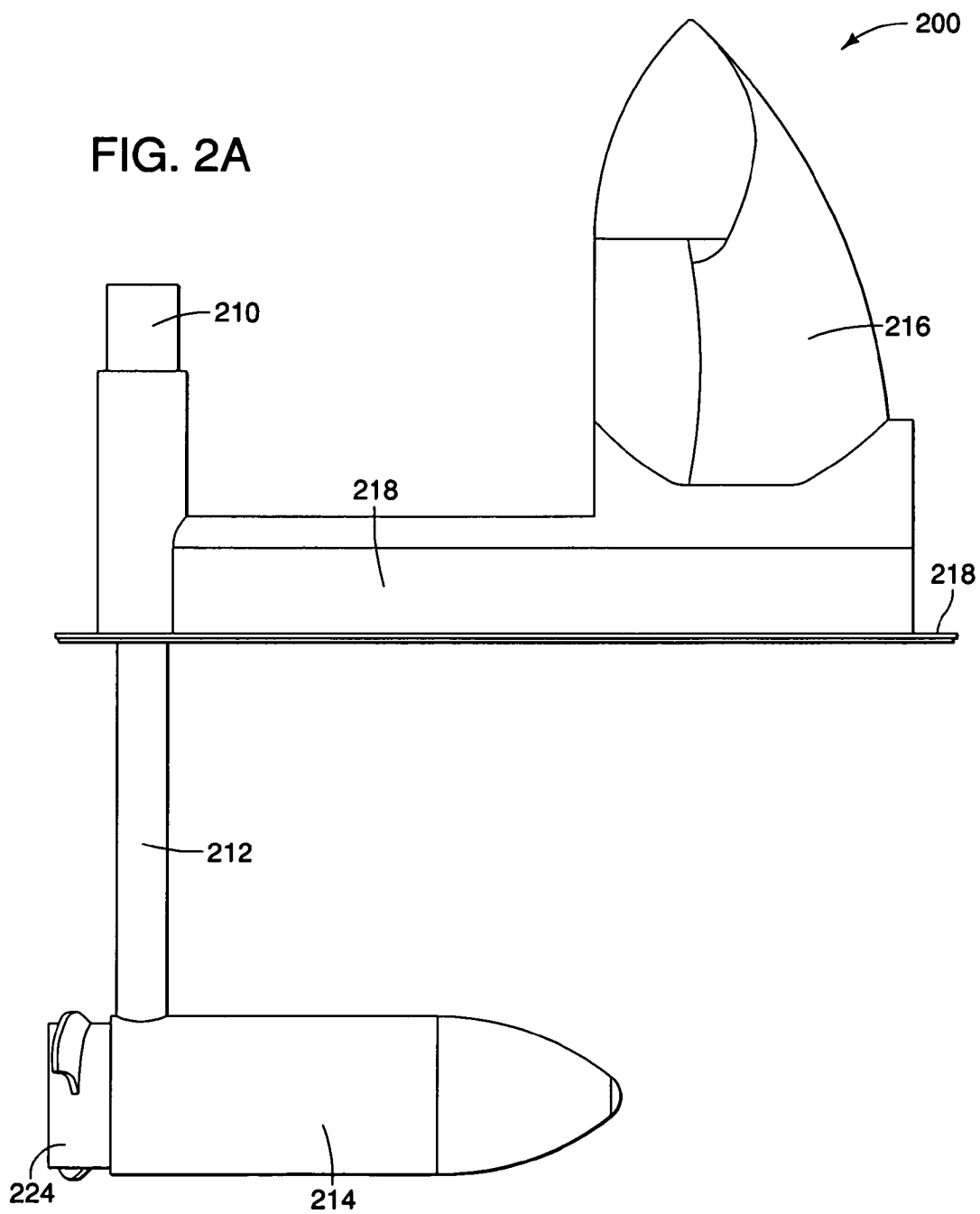

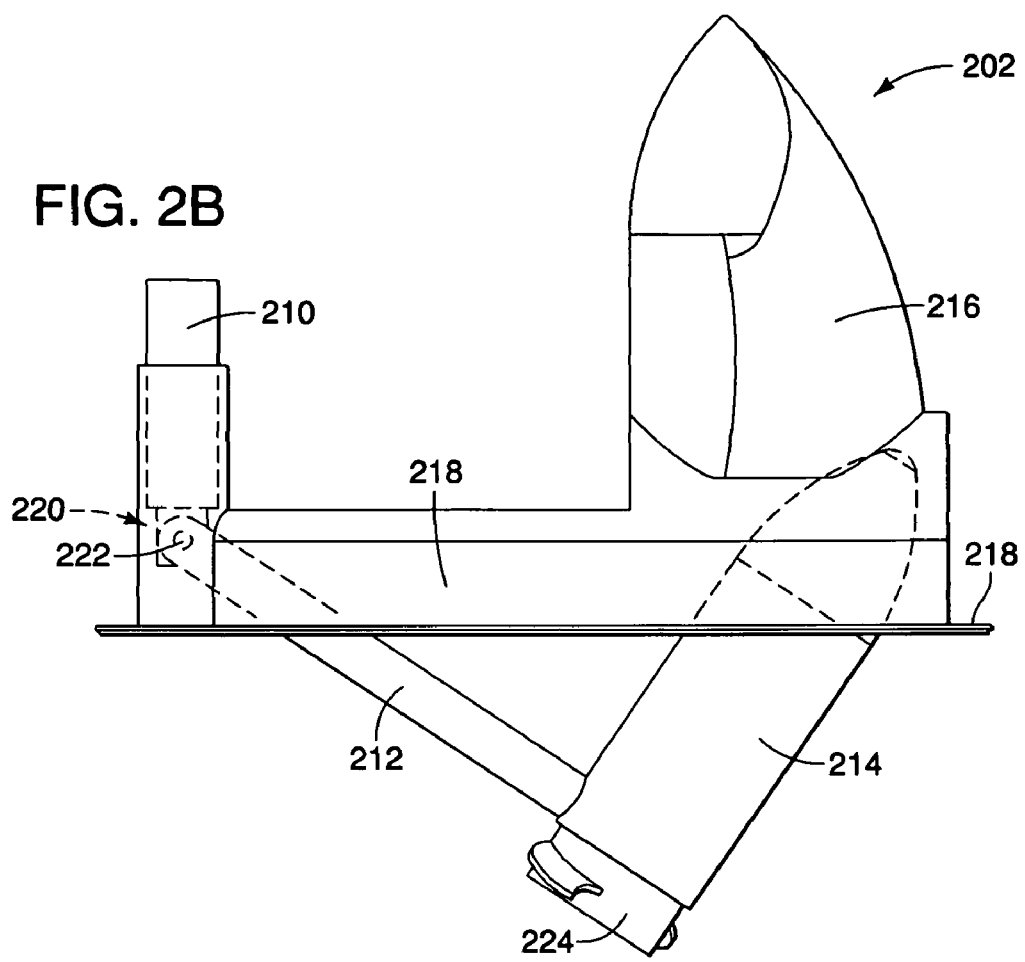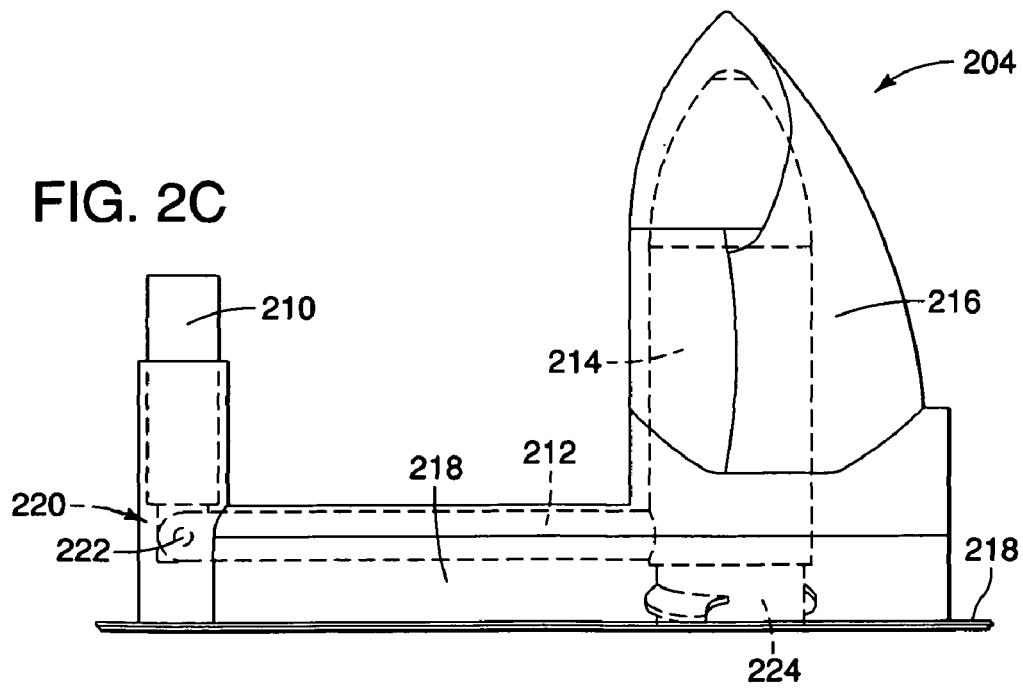

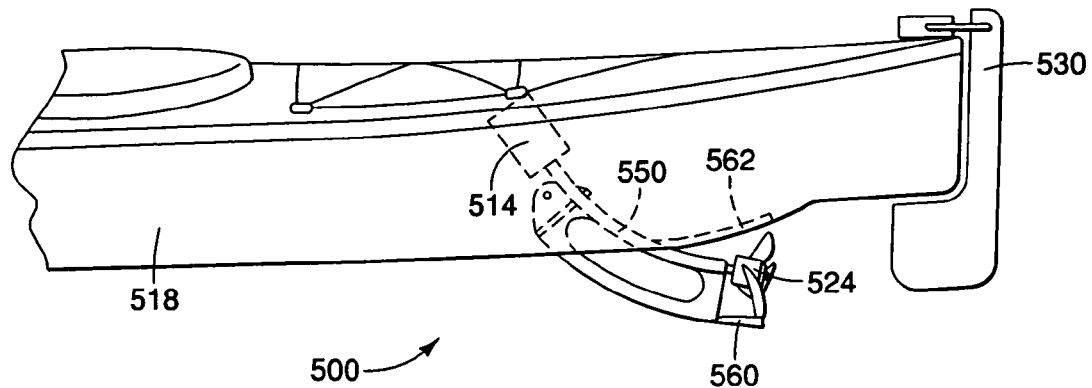
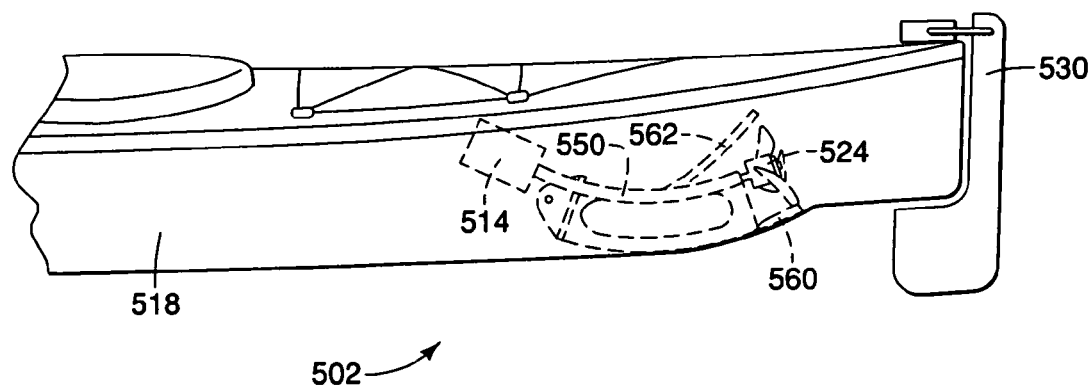

ELECTRICALLY POWERED WATERCRAFT

CROSS REFERENCE TO RELATED APPLICATIONS

This application claims the benefit of U.S. Provisional Application No. 60/915,074 filed Apr. 30, 2007, titled "Electric Kayak" and whose entire contents are hereby incorporated by reference. This application also claims the benefit of U.S. Provisional Application No. 61/048,914 filed Apr. 29, 2008, titled "Electric Kayak" and whose entire contents are hereby incorporated by reference. This application also claims the benefit of PCT/US2008/062114 filed Apr. 30, 2008, titled "Improved Electrically Powered Watercraft" and whose entire contents are hereby incorporated by reference.

TECHNICAL FIELD

Embodiments of the present invention pertain generally to electrically powered watercraft. More particularly, embodiments of the present invention are directed to the retractable propulsion units, steering mechanisms and other improvements in such electrically powered watercraft.

BACKGROUND

Small, human-powered watercraft (e.g. kayaks, canoes, dinghies, rowboats, launches, tenders, etc.) are as popular as ever throughout the world for their simple, quiet and economical operation. In recent history, some attempts have been made to motorize such small watercraft, albeit with mixed success, whether due to lack of sufficient power, noisy operation, complex systems or expenditure of significant resources. However, a need persists for a small traditionally human-powered watercraft to have auxiliary and redundant power available.

For example, we have found that there are some hobbyists who have built their own crude electric watercraft. The majority of these projects are undertaken by anglers who enjoy fishing from a small boat, and need mobility without paddling. Most of the time, these anglers use a marine lead acid battery along with a trolling motor to achieve their goals. However, these embodiments are not well suited for portability, as the propulsion system does not have a readily removable and/or retractable feature. Further, the properties of the motor, hull and propulsion system are rather primitive, leading to a very low efficiency (rendering either slow speed, short duration or significant weight from heavy motor and its power source). In this regard, a lightweight traditional craft capable of efficient and quiet motorized operation, having high maneuverability, with a retractable and/or removable motor would be highly advantageous.

Similarly, sea kayaking is another hobby enjoyed by many people around the world. In many cases, hobbyists endeavor a multi-hour or even multi-day kayaking trip and find that their muscles fatigue. In such cases, it would be of tremendous benefit to have a propulsion system on the kayak to assist the kayaker to travel farther and/or faster than that by human propulsion alone. Moreover, some kayakers may lack the endurance for extended kayaking trips, so a self-propelled kayak that gives paddlers a chance to rest would be appealing. A variety of demographic groups, such as anglers, touring kayakers, and wildlife spectators, would also be interested in a self-propelled kayak or other small watercraft.

Using electric power has several advantages. First, it allows the watercraft to enter regulated bodies of water, where gas motors may not be used. Second, it is also quiet, which is important to both anglers and wildlife spectators. Lastly, it is environmentally friendly, which is a characteristic likely very important to most kayakers and those that regularly enjoy the outdoors. Finally, it is significantly less expensive to use electric power instead of petroleum based fuel.

Waterside resorts or rental businesses would also benefit from the development and availability of an efficient, quite, portable electrically powered watercraft for recreational boating. These buyers will have unique needs because a large percentage of their clientele will have minimal boating experience, and as such the traditional paddle may not provide a suitable form of propulsion. By way of example, an electric kayak would be safer than a traditional kayak, since a fatigued kayaker could return to shore using electric power. Likewise, elderly or physically-challenged individuals would be able to participate, whereas traditional human-powered kayaking or canoeing might be too demanding given the physical challenges.

Several attempts have been made to design and build such a motorized watercraft, as exhibited by other patents and publications. For example U.S. Patent Application Publication No. 2002/0195039 ("Anderson") discloses a motorized kayak having a gasoline powered inboard-style propulsion unit. However, Anderson exhibits several shortcomings in the art, namely: noise and pollution emitted from the combustion engine, the need to carry a fuel in the hull, weight from such a combustion engine and a fuel tank being permanently affixed into the hull of the watercraft, and a severe a lack of steerability, among other shortcomings.

Likewise, U.S. Pat. No. 5,937,785 ("Murray") discloses a similar inboard-style propulsion unit with an electric motor rather than a combustion engine. However, Murray also exhibits similar shortcomings with respect to its permanent motor and power source weight, its lack of steerability as the thrust from its propulsion system, and like Anderson, the thrust from the propulsion unit cannot be directed to ease steering.

U.S. Patent Application Publication No. 2007/0012236 ("Caples") discloses a retractable propulsion unit utilizing an electric motor—but such motor is not steerable. In this regard Caples, like Anderson and Murray, exhibits a distinct deficiency in steerability. More particularly, our research and testing has shown that it is very difficult to turn a motorized kayak wherein the propulsion unit cannot be steered. In essence, a human being exerting a force with a paddle or even a rudder (approximately $1/10^{th}$ of a horsepower or less) is working against the force of a motorized propulsion unit ($1/2$ horsepower or greater, likely five, ten or more times the horsepower of the paddle or rudder). Quite simply, a human exerting force on a paddle is an insufficient force to overcome the forward thrust and forward inertia of a motorized watercraft.

Thus, what is badly needed in the art is an electrically powered watercraft having a properly designed retractable propulsion unit. It is preferable that such a retractable propulsion unit be steerable—thereby having the ability for its thrust to be controllably directed in different directions thus compensating for the difference in power between the human and the propulsion unit. In order to stow the propulsion unit, it is frequently necessary to create a cavity in the hull that is exposed to the water. Significant improvements in efficiency can be rendered if the hull can remain streamlined without unnecessary turbulence created by this cavity. Further, significant improvements in portability can also be rendered to the user if such a propulsion unit (and its power supply) are readily removable from the watercraft.

Thus, while a need exists for certain improvements in propulsion, steering, efficiency and portability in small traditionally human-powered watercraft, such needs have not been filled by those practicing in the art.

SUMMARY

Embodiments of the present invention are directed toward the above described improvements, and more particularly toward an electrically powered watercraft. The improved electrically powered watercraft detailed herein evidences significant advancements in steerability, portability, efficiency and other tangible aspects. These advancements collectively render a motorized watercraft virtually indistinguishable in feel, weight and appearance from an ordinary non-motorized kayak.

Other embodiments of the present invention are directed toward the particular retractable propulsion units, steering mechanisms and other features configured in such a motorized watercraft. By way of example, a propulsion unit can be configured to extend below the hull of the watercraft, or alternatively be retracted and stowed inside the cavity in the hull of the watercraft. Some embodiments described herein allow the retractable propulsion unit to also be steerable, such that the vector of the thrust from the propeller can be directed to steer the craft. Since some embodiments disclosed also utilize conventional steering mechanisms (e.g. a rudder), disclosed devices also provide a way to selectively integrate these conventional steering mechanisms with the steerable, retractable propulsion unit. Thus, a propulsion unit can be selectively disengaged from the conventional steering mechanism of the craft. Such features provide substantial steerability and flexibility not exhibited by the prior art.

Various options and approaches of embodiments of the invention are also discussed throughout the technical disclosure, including additional components, characteristics and aspects that enhance the performance of various embodiments. It is understood that while small electrically powered watercraft (e.g. a kayak) is an exemplary application used to describe specific details of a best mode of practice of the invention, the presently disclosed invention contemplates other embodiments and watercraft not necessarily disclosed within the present examples.

BRIEF DESCRIPTION OF THE DRAWINGS

Embodiments of the invention are illustrated by way of example, and not by way of limitation, in the figures of the accompanying drawings and in which like reference numerals refer to similar elements, wherein:

FIG. 2A is a side view of a steerable retractable propulsion unit in an extended position according to an embodiment of the invention.

FIG. 2B is a side view of a steerable retractable propulsion unit in a partially retracted position according to an embodiment of the invention.

FIG. 2C is a side view of a steerable retractable propulsion unit in a fully retracted position according to an embodiment of the invention.

FIG. 5A is a side view of a retractable propulsion unit in an extended position according to an embodiment of the invention.

FIG. 5B is a side view of a retractable propulsion unit in a fully retracted position according to an embodiment of the invention.

DETAILED DESCRIPTION OF PREFERRED EMBODIMENTS

Figure 1A:
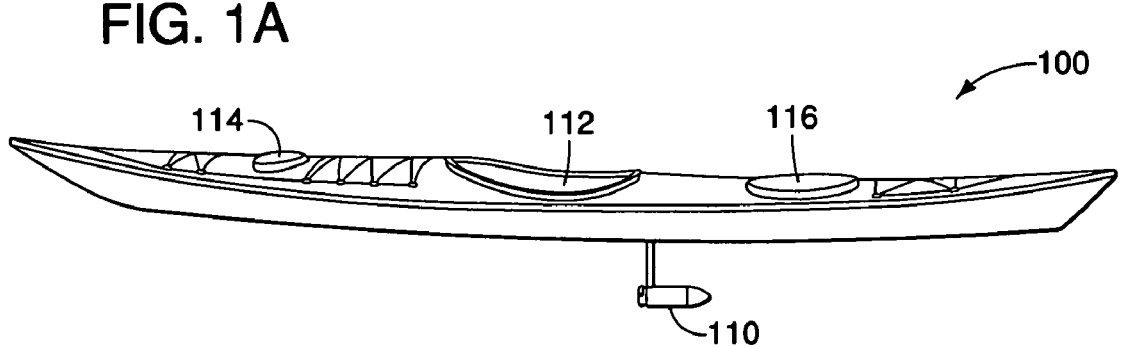
FIG. 1A is a side view of an electric kayak with rear-positioned propulsion according to an embodiment of the invention.

In the following description, for the purposes of explanation, specific details are set forth in order to provide a thorough understanding of the invention. However, it will be apparent that the invention may be practiced without these specific details. In other instances, well-known structures and devices may be depicted in block diagram form in order to avoid unnecessary obscuring of the invention. Section titles and references appearing within the following paragraphs are intended for the convenience of the reader and should not be interpreted to restrict the scope of the information presented at any given location.

Various aspects and features of example embodiments of the invention are described in more detail hereinafter in the following sections: (i) Functional Overview, (ii) Steerable & Retractable Propulsion Units, (iii) Other Components And Considerations, and (iv) Conclusion.

Functional Overview

The improved electrically powered watercraft disclosed in the present technical disclosure solves various aforementioned shortcomings posed by the prior art. More particularly, a motorized propulsion system in a traditional human powered personal watercraft such as a kayak provides for a redundant and backup propulsion system. Such a motorized propulsion system expands the use of the personal watercraft both in persons who can utilize the watercraft, and for those utilizing the watercraft, further expands the range and speed of the watercraft when in use. Further, such a redundant propulsion system increases the safety of the watercraft as it is capable of propulsion even if the user becomes unable to paddle or otherwise fatigued during the course of operation.

For the purposes of the present disclosure, various embodiments are directed toward a battery powered electric kayak, which will be discussed at length. However, such discussion should not be construed to limit the scope of the present disclosure and present invention to only a motorized kayak. It is noted that the various propulsion, steering and speed control systems, or other components described herein, while described herein for purposes of improving a traditional kayak, can also be utilized in a number of other embodiments including canoes to row boats or other personal watercraft.

At the basic level, embodiments of the present invention primarily comprise a hull of a personal watercraft and a propulsion unit. Preferably, the propulsion unit can be retracted into the hull for stowing and transport. Preferably, the watercraft should remain lightweight, sleek and the performance will not noticeably differ from that of a normal watercraft when paddled. Because the propulsion units are typically battery powered (though not restricted to such), embodiments of the present disclosure are typically quiet so that the user will enjoy the same experience as in a non-motorized traditional personal watercraft.

Preferred embodiments of the present disclosure are economical to design and manufacture, as they are typically developed using conventional marine grade components. As such, maintenance and replacement of such components is readily available in the marketplace.

Turning to FIG. 1A, a personal watercraft 100 is illustrated having a propulsion unit 110 in its rearward portion, located just behind the seat 112.

Figure 1B:
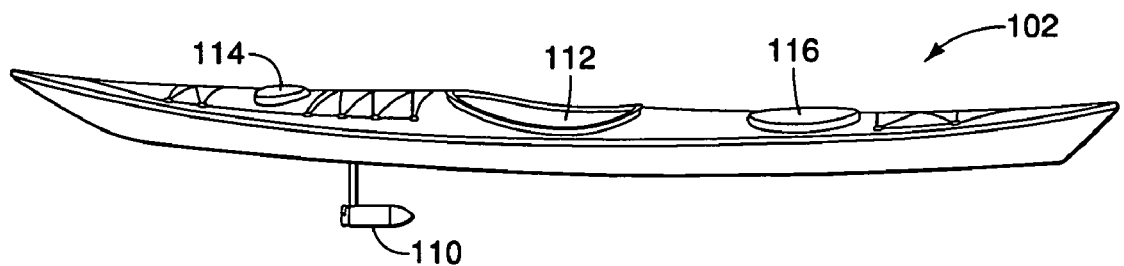
FIG. 1B is a side view of an electric kayak with front-positioned propulsion unit according to an embodiment of the invention.

Alternatively, as illustrated in FIG. 1B, a personal watercraft 102 can have a propulsion unit 110 configured in its forward portion, just in front of the seat 112.

Typically, embodiments of the present invention can be manufactured by design or otherwise modified or retrofitted into traditional non-motorized personal watercraft. If one is proceeding with the latter course, typically modifications are made to the hull of the personal watercraft using ordinary materials such as wood or fiberglass.

Typically, a cavity is designed into the hull, or an insert is mounted into the hull providing a cavity for a propulsion unit to be retracted or stowed. The cavity (and insert if used) should be of the same size and shape of the desired propulsion system, thereby avoiding excess voids in the cavity. Further, the hull should have as few discontinuities as possible thus reducing drag created by turbulence.

Steerable & Retractable Propulsion Units

Turning to FIG. 2A, a steerable retractable propulsion unit 200 is illustrated in an extended, operating configuration. Generally speaking, the retractable propulsion unit 200 comprises an assembly 210 coupled to a shaft 212, which in turn is coupled to a motor 214. In an extended, operating configuration, the motor 214 is generally positioned below the shaft 212 and assembly 210. The assembly 210 can be rotated in order to steer the propulsion unit 200 and thus the kayak.

Turning to FIG. 2C, a retractable propulsion unit 204 is illustrated in a fully retracted, stowed configuration. More particularly, a motor 214 of the propulsion unit 204 can be folded into a cavity 216 defined by the hull 218, thereby reducing the drag on the kayak.

Preferably, the cavity 216 into which the motor folds is substantially covered across the bottom of the hull 218 so that water (not shown) passing along the hull 218 surface remains undisturbed when the kayak is in operation without using the propulsion unit 204.

Turning to FIG. 2B, a retractable propulsion unit 202 is illustrated in a partially retracted configuration, namely either when being retracted into the cavity 216 or being extended into the environment for operation.

The retractable design of the propulsion unit 200 can be implemented in numerous ways. Preferably, the motor 214 folds up by releasing a pin (not shown) holding the shaft 212 vertical at the pivot point 220. This allows a user (not shown) to pull the motor 214 upward by a wire (not shown) attached to the motor 214, such that the motor 214 is pulled into the cavity 216.

In preferred embodiments, the motor 214 can be positioned into the cavity 216 by releasing the pin (not shown) and allowing the motor 214 to propel itself into the cavity 216. More particularly, a propeller 224 continues spinning and propelling the motor 214, but since the shaft 212 can pivot at pivot point 220, the motor 214 propels itself into cavity 216. Optionally, a catching or locking mechanism (not shown) can be configured to prevent the motor 214 from falling back downward once it has been positioned upward into the cavity 216. Such a method for retracting the motor 214 eliminates the need for a secondary means to retract the motor 214 into the cavity 216. In order for this method to work smoothly and efficiently, the speed of the motor 214 needs to be restricted, preventing the motor 214 from swinging up too forcefully and possibly damaging the hull 218. Alternatively, a secondary motor can be used to retract the propulsion system.

Figure 3A:
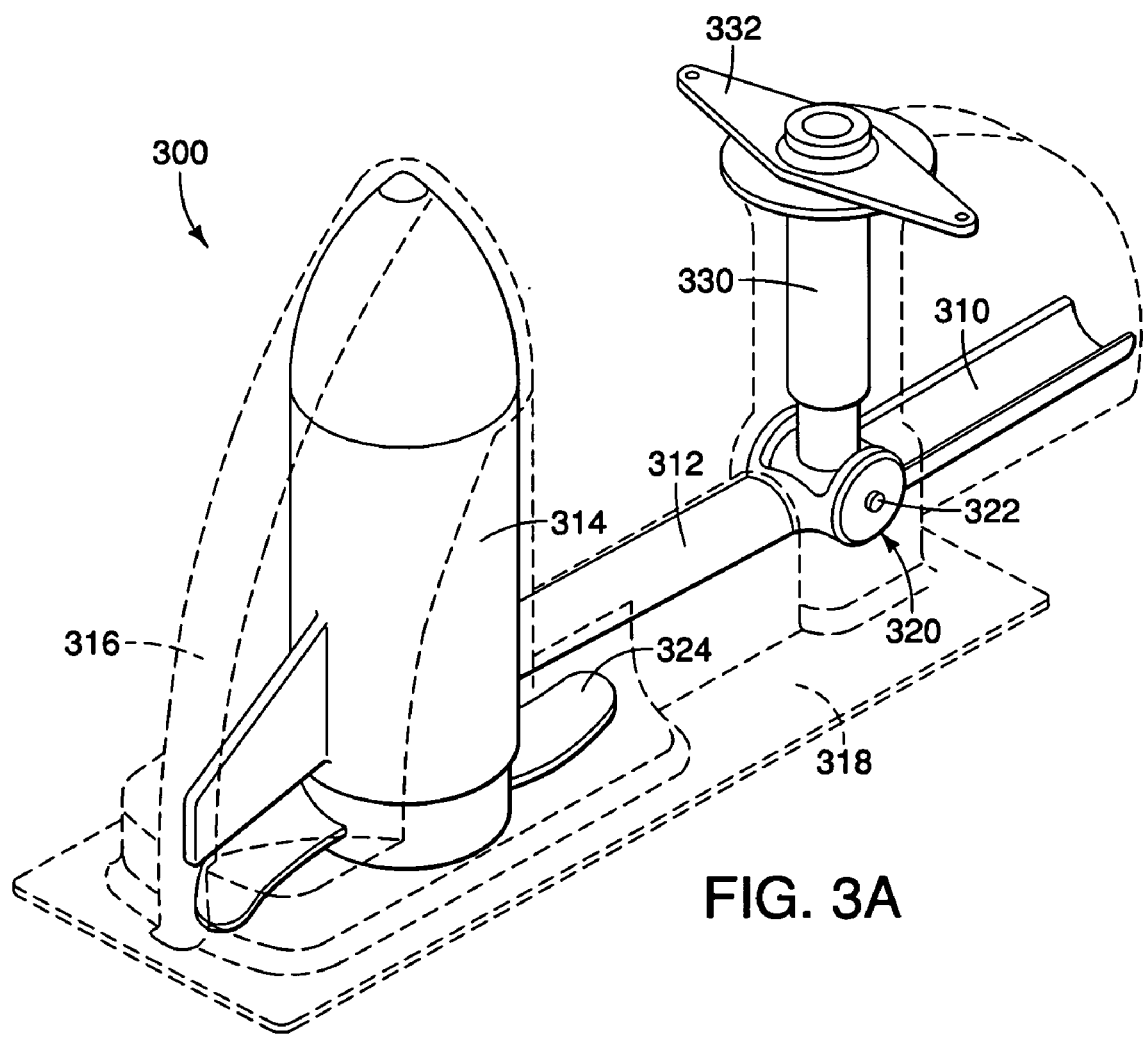
FIG. 3A is an isometric view of a steerable retractable propulsion unit in a fully retracted position according to an embodiment of the invention.

Turning to FIG. 3A, another retractable propulsion unit 300 is illustrated in a fully retracted, stowed configuration. As illustrated, the propulsion unit 300 further comprises one or more cover plates 330 over a cavity 316 to reduce drag both when a motor 314 is in a fully retracted configuration (as shown in FIG. 3A) and when the motor 314 is in an extended configuration (as shown in FIGS. 3B and 3D).

One challenge presented by one or more plates 330 in such a design is the need to substantially seal the closure or seam of the one or more plates 330. If water (not shown) leaks behind the one or more plates 330, this phenomena can increase weight on the kayak and negatively affect maneuverability of the kayak.

Figure 3B:
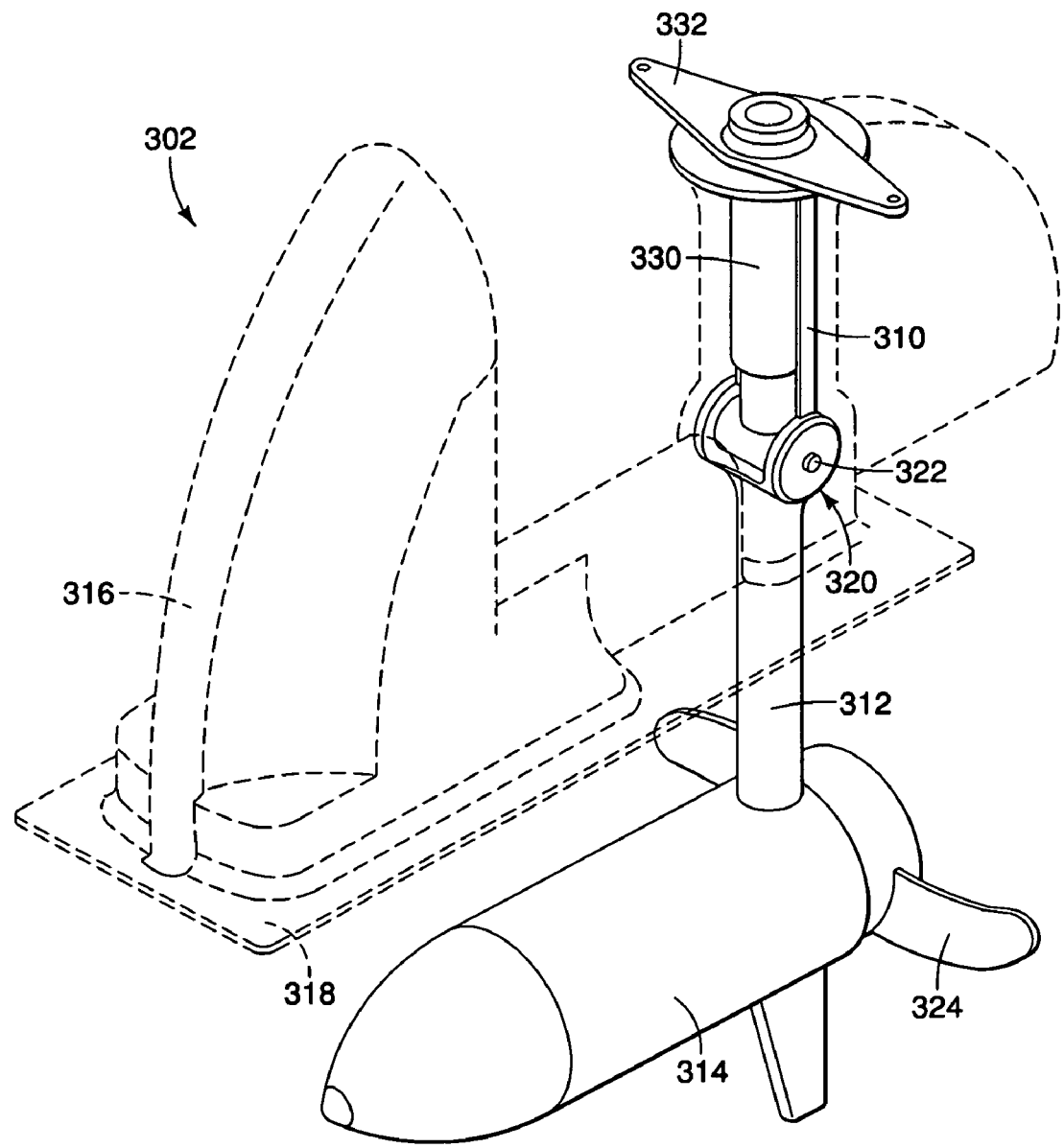
FIG. 3B is an isometric view of a steerable retractable propulsion unit in an extended position according to an embodiment of the invention.

The retractable design illustrated in FIGS. 3A and 3B allows a kayak to have identical appearance to that of a typical kayak both when the motor 314 is in use and when the motor 314 is not in use. Further, rotation of the assembly 310 can provide for steering capabilities of the propulsion unit 300 without adding a supplemental steering unit such as a rudder (not shown). The steering bracket 332 connects to the rudder cables (not shown) which are connected to conventional controls (e.g. foot pedals, not shown) allowing the user to steer the motor 314.

Preferably, the rudder is connected to both the conventional controls and also to a bracket 332 on the propulsion units 300 and 302. A mechanism 330 selectively and fixably couples assembly 310 to bracket 332, thereby allowing the conventional controls for the steering to also control the steering of the motor 314. When propulsion units 300 and 302 are not in the extended position (thus not in use), mechanism 330 disconnects assembly 310 from bracket 332, thus disengaging the propulsion units 300 and 302 from the conventional controls. One such mechanism would be a combination of a plunger and a groove to accommodate this selective coupling need, although a variety of possibilities for such a mechanism exist. In such an embodiment, the locking mechanism 330 can be a plunger (not shown) that pulls the assembly 310 into a groove (not shown) on the mechanism 330 when the motor 314 is extended. Certain other mechanisms providing for alignment of the propulsion units 300 and 302 (thereby preventing mechanical conflict when the propulsion units 300 and 302 are retracted) is preferable.

Further, propulsion units 300 and 302, as desired, can also be configured to be fully removable when the kayak is to be used without motorized propulsion, namely by using a selective (e.g. snap in, snap out) connection (not shown) that secures the shaft and establishes electrical connections. Such a selective connection can be positioned either at the top of the shaft 312 or at a middle point along the shaft 312.

Such a selective connection, by way of example, can be similar to a paddle locking mechanism with two spring loaded buttons on either side of a tube that is inserted into the slightly larger accommodating reciprocal shaft. Configured on the sides of the receptacle shaft are two holes into which fit the spring loaded buttons. Inside each end of the shaft is an end of a watertight connector.

Figure 3C:
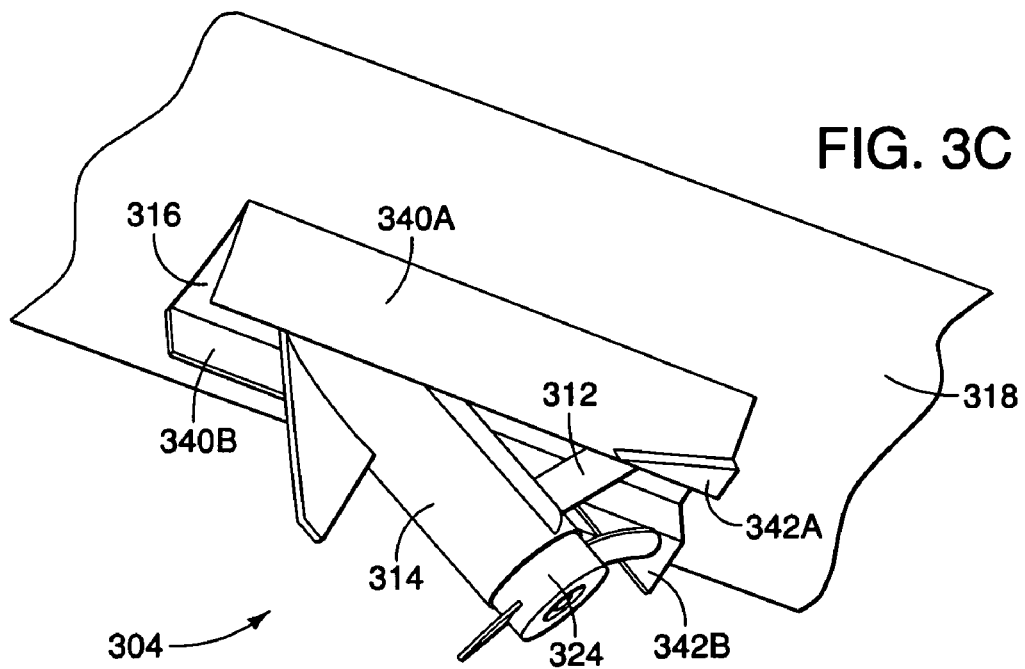
FIG. 3C is an isometric bottom view of a steerable retractable propulsion unit having bombay doors in a partially retracted position according to an embodiment of the invention.
Figure 3D:
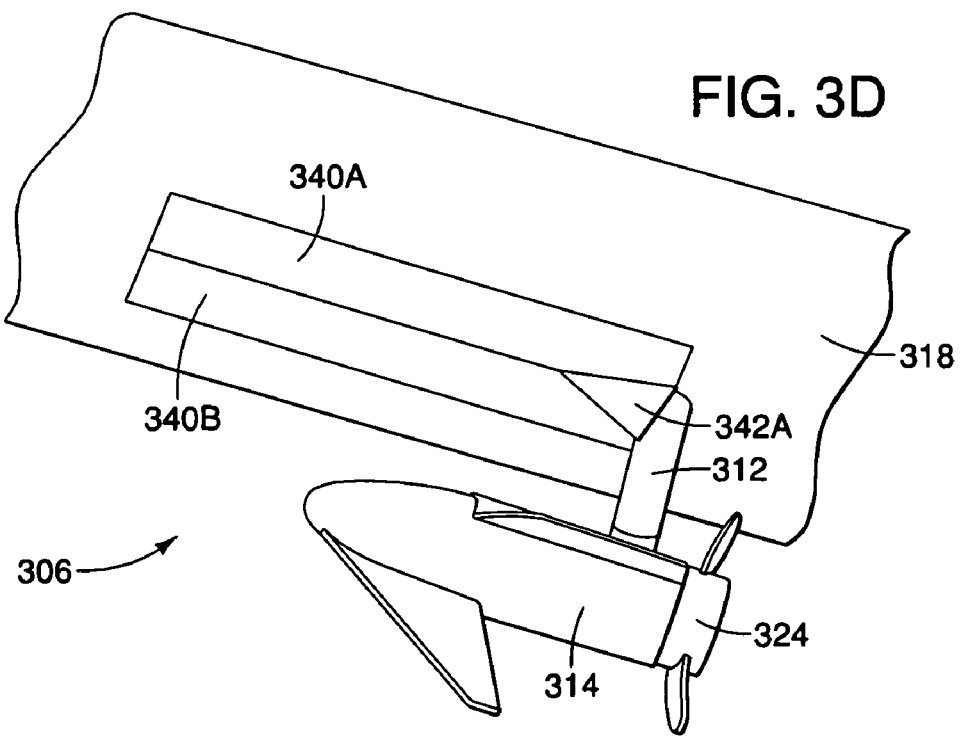
FIG. 3D is an isometric bottom view of a retractable propulsion unit having bombay doors in an extended position according to an embodiment of the invention.

Turning to FIG. 3C, a retractable propulsion unit 304 is illustrated in a partially retracted configuration, namely either when being retracted into the cavity 316 or being extended into the environment for operation.

Turning to FIG. 3D, an alternate view of one or more plates 340A and 340B is illustrated with a retractable propulsion unit 306 in an extended configuration. The one or more plates 340A and 340B are spring loaded in a closed position such that movement of motor 314 forces the one or more plates 340A and 340B open by either pushing on them from above (when the motor is in the retracted position and is extending downward), or by spreading them using one or more cams 342A and 342B on the part of the one or more plates 340A and 340B that are nearest in proximity to the shaft 312. The cams 342A and 342B are angled outward and downward with respect to the shaft 312. Thus, movement of the shaft 312 forward forces the one or more plates 340A and 340B apart and downward. Preferably, one or more locking mechanisms (not shown) are configured upon the shaft to lock the shaft into either a fully retracted position or extended position, as desired.

Turning to FIGS. 5A and 5B, an alternate retractable propulsion unit 500 and 502, respectively, is illustrated. As shown, rather than a motor 514 being submerged, the motor 514 is instead contained within a hull 518 of the watercraft. A driveshaft 550 transfers power from the motor 514 to a propeller 524. FIG. 5A illustrates the propulsion unit 500 in an extended, operating configuration, whereas FIG. 5B illustrates the propulsion unit 502 in a fully retracted, stowed configuration. Note that preferably a cover plate 560 is mounted under the propeller, such that when the propulsion unit is retracted it covers the substantial opening of the cavity (not shown) in the hull where the propulsion unit 502 is stowed. A plate connected to the propulsion assembly can also cover the area above the propeller when the unit is fully extended downward. This would prevent cavitation and reduce drag when the prop is fully extended below the boat.

Figure 6A:
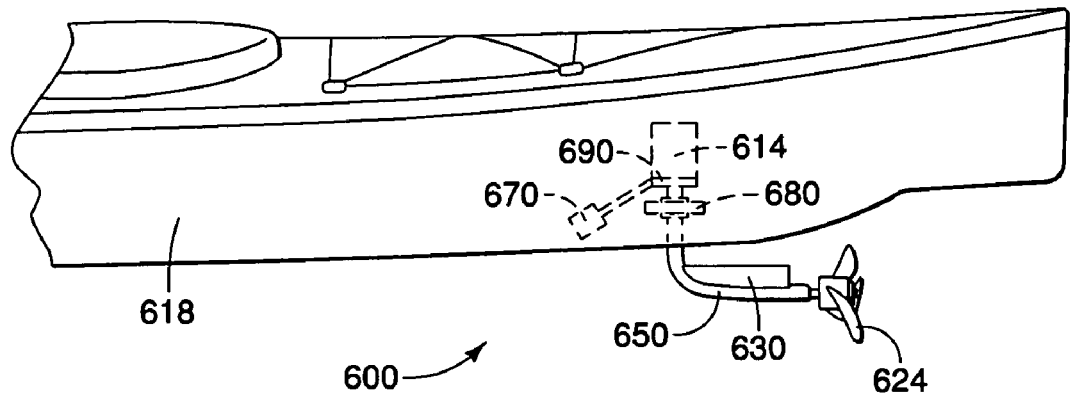
FIG. 6A is a side view of a steerable retractable propulsion unit in an extended position according to an embodiment of the invention.

Turning to FIG. 6A yet another alternate embodiment of a steerable retractable propulsion unit 600 is illustrated. More particularly, the propulsion unit 600 comprises a motor 624 providing rotational force, a propeller 624, and a flexible driveshaft 650 transferring rotational force from the motor 614 to the propeller 624. Preferably, a rudder 630 is coupled to the flexible driveshaft 650, thereby enhancing the steering capabilities of the propulsion unit 600. A mount 680 provides means for the flexible driveshaft 650 to be both coupled to a hull 618, but allows the flexible driveshaft 680 to rotate about a vertical plane extending through the longitudinal axis of the watercraft. Mount 680 also allows the driveshaft 650 to rotate about its axis, thereby providing selectively directional thrust from the propeller 624. Typically in the embodiment as illustrated, the driveshaft 650 can be selectively steered by attaching control cables (not shown) to the motor 614 or driveshaft 650.

A linear actuator 670 is coupled to the motor 614 with the utilization of a ring bearing 690 or other device (thereby allowing the linear actuator 670 to be coupled to the motor 614 but still allowing the motor 614 to rotate in conjunction with the flexible driveshaft 650).

Figure 6B:
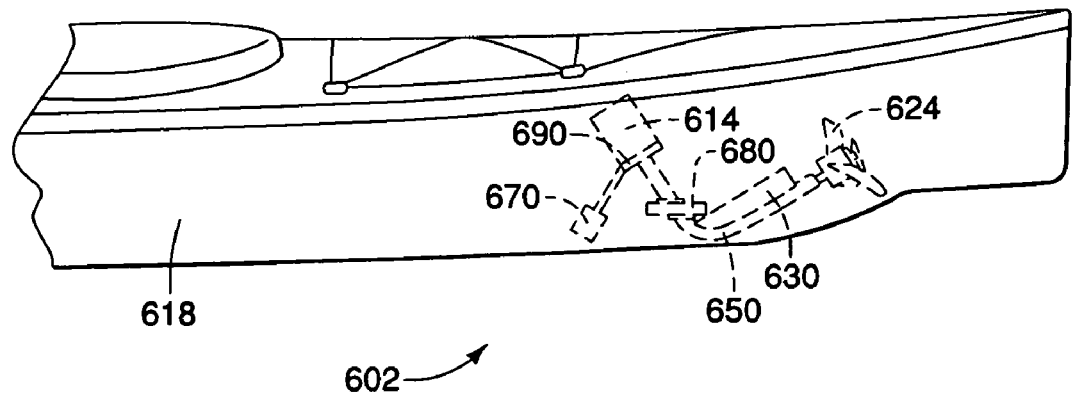
FIG. 6B is a side view of a steerable retractable propulsion unit in a fully retracted position according to an embodiment of the invention.

As illustrated in FIG. 6B, an electrically powered watercraft 602, similar to the electrically powered watercraft of 600, is shown in a fully retracted position for transport, storage or non-motorized use. It is noted that the propeller 624 and flexible driveshaft 650 are preferably retracted into a cavity (not shown) in the hull 618.

Alternatively, a folding propeller (not shown) can also be used as a substitute for a standard propeller—thereby providing some advantageous steering capabilities when the propeller 624 is not in use.

One of the advantages of the retractable propulsion unit design is the ability to absorb energy from a collision of the propulsion unit against an underwater object in the environment. Because kayaks and other small watercraft are sometimes used in shallow waters, it is helpful that such a design be utilized that is resilient to interaction with the bottom. The retractable propulsion unit design is able to fold upward when impacted, which will protect the shaft from experiencing extreme forces. Such a design can be configured to comprise a latch that releases when a given impact force is exceeded.

One shortcoming with relying on the motor to move the motor into the cavity is that when the battery does not have sufficient power remaining, the motor cannot propel itself into the cavity in the fully retracted position. This shortcoming can be overcome by manually pushing the motor into the cavity and locking it if a lock is configured. Since such a lock does not take any energy to hold the motor inside the cavity, the motor will remain fully retracted despite the power loss. However, this is not an elegant alternative, as the user would have to get underneath the kayak.

An alternative approach is to use powered means (e.g. a small motor, hydraulic pump, linear actuator, cable, morse cable, winch, etc.) to extend and retract such a propulsion unit. For example, a linear actuator or a cable can be connected to a lever arm of the propulsion unit to extend or retract the propulsion unit. Using such powered means to extend or retract the propulsion unit alleviates the need for a secondary locking mechanism, but also requires more battery energy.

Figure 4A:
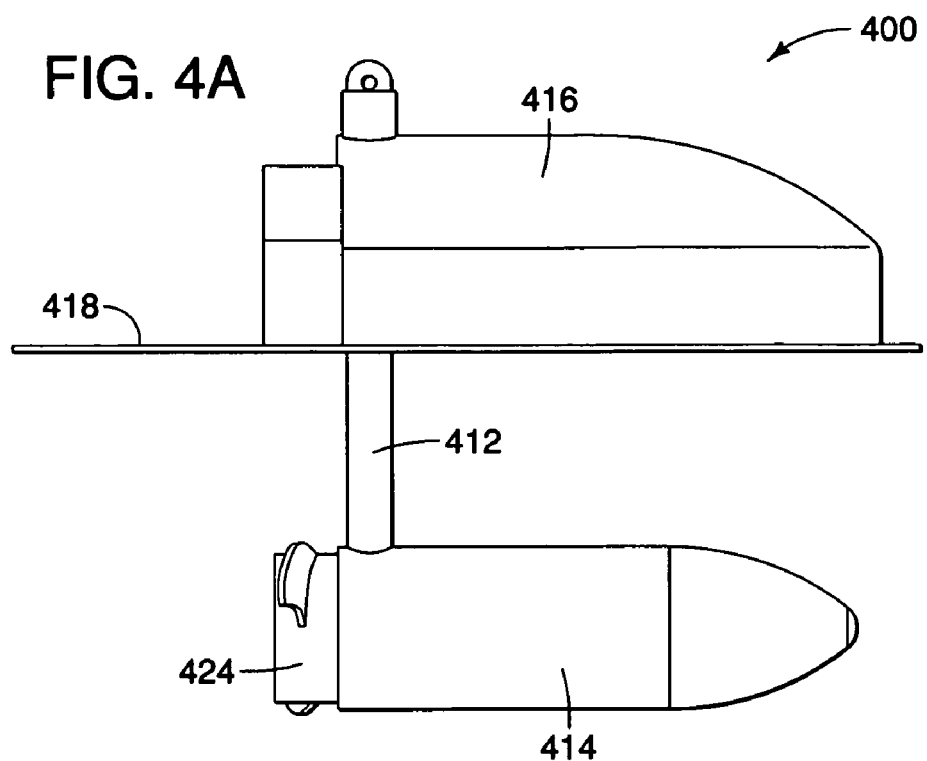
FIG. 4A is a side view of a steerable sliding propulsion unit in an extended position according to an embodiment of the invention.

Another design alternative for a retractable propulsion unit is a sliding propulsion unit, in which a shaft slides vertically in the kayak, retracting the motor into a shaped cavity within the hull. Turning to FIG. 4A, a sliding propulsion unit 400 is illustrated in an extended (operating) configuration. As noted, the motor 414 is situated generally below a hull 418 by a shaft 412, providing sufficient clearance for a propeller 424 to clear the hull 418 when in operation.

Figure 4B:
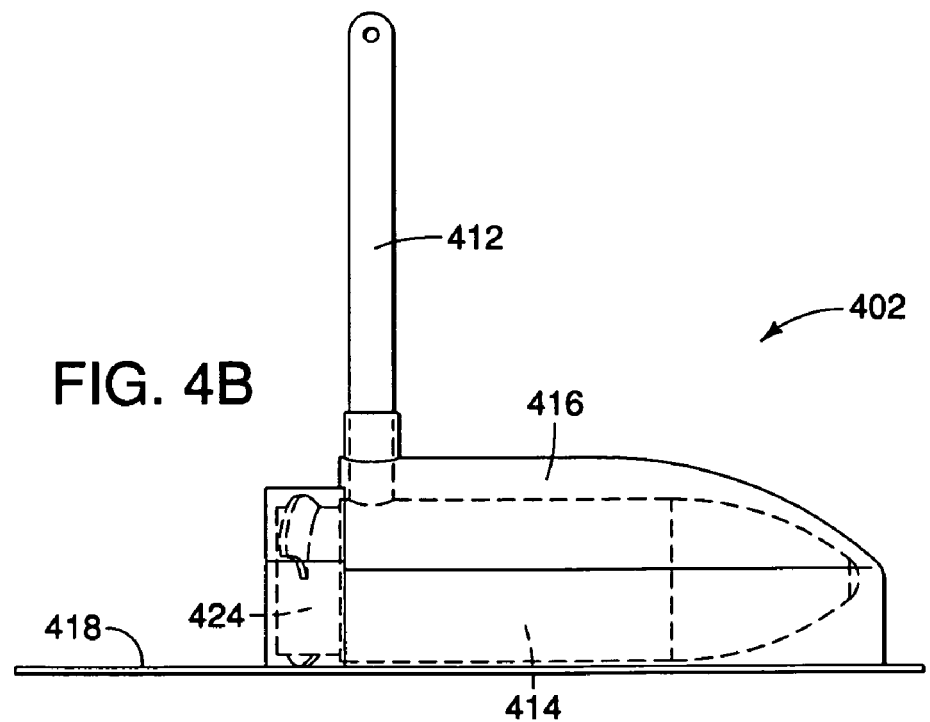
FIG. 4B is a side view of a steerable sliding propulsion unit in a fully retracted position according to an embodiment of the invention.

As illustrated in FIG. 4B, the motor 418 and propeller 424 can be retracted and stowed inside a cavity 416 defined by the hull 418 by pulling the shaft 412 upward. Shaft 412 can alternatively be pulled up by means (not shown) of a pulley system or a separate retracting motor. With a pulley system, a user may physically pull the motor assemblage up using a rope or small winch. With a separate retracting motor, such a retracting motor could act directly upon the shaft 412 using a rubber wheel or act using a gear upon notches in the shaft 412 to pull the motor assemblage up.

Additional features can also be added to the sliding propulsion unit design. For example, one or more plates (not shown) can be attached to the shaft 412 thereby sealing the cavity 416 when the motor 414 is extended. Utilizing such one or more plates can reduce drag, increasing kayak speed and battery efficiency. Similarly, the bottom of the motor 414 can be contoured such that it fits smoothly into the cavity 416 when the motor 414 is retracted—likewise reducing drag and increasing efficiency. Further, shaft 412 can also be designed to telescope (not shown) so it does not require as much vertical space in the kayak.

If allowed by the configuration, one of the benefits of the sliding propulsion unit 402 is the ability to retract the propulsion unit 402 into the cavity 416 of the hull 418 my manual means (e.g. pulling the shaft 412 upward) while the watercraft is still in the water. This allows the propulsion unit 402 to be retracted even if the power source for the motor 414 is depleted.

It is further preferable, to the extent possible, to also configure a hinge or pivot point (not shown) in shaft 412 to accommodate the impact of the motor 414 with an underwater object. For example, a hinge with a safety pin (not shown) could be added to allow the motor to absorb more collision force.

Other Components and Considerations

While it is possible to design a custom motor to be built for the motorized personal watercraft described herein, it is also cost effective and of reasonable effort to adapt off-the-shelf marine motors (e.g. a fishing trolling motor). For example, a typical electric trolling motor with 30 lbs of thrust has been shown to be more than sufficient. By utilizing and customizing such an off-the-shelf motor, the motorized personal watercraft can be designed with economics, maintenance and support in mind.

One of the motor modifications deals with the retractable or sliding features of the personal watercraft, including when the motor is impacted by an external force (e.g. an underwater object). To accomplish this, as illustrated in FIGS. 1A and 1B, it is typically possible to rotate a motor 110 one hundred and eighty degrees so that the motor 110 becomes a pull-style motor (as opposed to a standard push-style trolling motor). Thus, if the motor 110 strikes an underwater object when the kayak is moving forward, the motor 110 will automatically swing backward and upward.

To turn a standard push-style trolling motor into a pull-style motor, the battery leads on the motor are reversed. Doing so typically still preserves the various variable speeds previously provided for forward and reverse.

Typically, when reversing such a trolling motor, it is also advisable to further streamline the propeller with a nose cone (not shown). Such a nose con can be created out of conventional materials such as metal, fiberglass, plastic or wood.

Turning briefly to FIG. 2B a pivoting mechanism 220 is illustrated, allowing the shaft 212 to rotate about a point at the pivoting mechanism 220. The pivoting mechanism can be configured from machined components. One component is the shaft 212 of the motor. Typically, the shaft 212 is shortened from original motor and a low carbon steel shaft 212 can be machined into its place. The shaft 212 connects to the assembly 210 with a small diameter pin 222 to create the pivot for the shaft 212. The pivot mechanism 220 serves as the physical means to couple the motor to the kayak.

It is further preferable to have a mechanism to lock the motor in the extended and fully retracted positions, (as illustrated by FIGS. 2A and 2C, respectively). When in use, the motor is in the extended position. In some embodiments, a strong electromagnet (e.g. a 40-lb force electromagnet) can be configured (not shown), so that the strength of the electromagnet will attract the shaft 212 and keep it secure.

An electromagnet is a good way to lock the motor in the down position because the magnetic power can be turned on and off, depending on the position of the motor and arm. When the motor 214 is engaged in a pulling forward direction, the force of the motor will be in favor of the shaft 212 against the hull 218, such that the hull 218 will prevent the motor from extending beyond an extended, operating position.

However, in the configuration above, if the motor is to be operated in the water in reverse, it is advisable to configure a stronger electromagnet to keep the arm locked in the extended position for reverse speeds. Alternatively, a linear motion solenoid (not shown) or other electronics can be configured to assist with keeping the motor 214 in an extended position kayak travels in reverse.

When not in use, the motor 214 is typically locked in the fully retracted position inside the cavity 216. In one embodiment, a pulling linear motion solenoid (not shown) can be used for this purpose.

Embodiments of the present invention can be readily manufactured or retrofitted from conventional fiberglass kayaks. Therefore, preferably all major components described herein should be integrated into the kayak hull using fiberglass or conventional fiberglass attachment means (e.g. adhesives, screws/nuts, rivots, etc.).

It is further preferable to configure a speed control system in embodiments of the present invention. Typically, the speed control system allows selective power settings to change the speed of the motor. Such a variable power control system can be configured in a number of ways, including the conventional speed control devices typically distributed with such a motor.

There are several types of batteries that can be considered for the power source for a motor in the embodiments described herein, including alkaline, lead acid, nickel cadmium (NiCd), lithium ion, and nickel metal hydride (NiMH). Lithium ion and NiMH are the preferred battery types in such embodiments, particularly due to their higher power-to-weight ratio and their reduced potential for environmental contamination (e.g. as compared to NiCd batteries). As illustrated in FIGS. 1A and 1B, there are typically two areas in which batteries (not shown) can be configured to be stowed during operation: a front hatch 114, a rear hatch 116 or directly under the seat 112. These access points provide ample space to place or remove the batteries from the personal watercraft.

It has been tested that approximately seven 12V, 13000 mAh NiMH batteries connected in parallel yields sufficient power to serve as a power source for the motor, yielding approximately 91 ampere hours. This amount of power provides an electric kayak configured with the motor described above approximately 3 hours of runtime at maximum draw.

It is preferable in some embodiments or applications to configure one or more convenient chargers for the batteries, thereby allowing the batteries to be charged without removal from the watercraft. Such chargers can be on-board chargers intended to plug into conventional alternating current (e.g. 120V) or vehicle charging adapters (e.g. 12V, 24V).

Alternatively, in other embodiments where the personal watercraft will not have access to electricity or fresh batteries, it is advisable to configure one or more solar cell panels to recharge the batteries utilizing the energy from sunlight. Such solar cells are readily available for conventional voltages such as 12V systems and can provide one or more hours of battery power per day. In some embodiments, such power is sufficient to allow the personal watercraft to be utilized on a beach or remote area without ever charging or removing the batteries from the watercraft.

If necessary, the batteries can be split between multiple locations. For example, in FIG. 1A, the front hatch 114 can house five of the seven batteries, while the remaining two batteries can be located under the seat 112. Having two locations house the batteries helps to balance the added weight of the motor and the other components, as it is important for the kayak to maintain balanced. More particularly, the batteries in the front hatch 114 counter balance the weight of the added components in the rear portion of the boat, such as the motor 110. The two batteries under the front seat would be situated near the center of gravity of the kayak under the seat 112. Preferably, the battery packs and storage compartments are designed with flexibility and water resistance in mind as well.

Preferably, there are at least two safety components that control the battery power. A kill switch (not shown) and a circuit breaker (not shown) are preferably connected in series with the overall circuit for the motor 110 and other features. The kill switch should be attached with a strap to the user's hand or leg. As such, if the strap will be pulled (disconnecting the circuit) if the user attempts to exit the craft without first detaching the strap. A breaker rated for approximately 60 amps has been found sufficient to protect the motor and other electronics from overcharge, short circuit or other electrical anomalies.

Returning to FIGS. 5A and 5B, as noted earlier, an optional steering unit 530 can be added to such a personal watercraft where increased maneuverability is desired. Preferably, such a steering unit (e.g. a rudder) would be retractable also, such that both the propulsion and steering of the watercraft can be retracted.

Without respect to any particular figure, it is further preferable to have a propeller configured on the motorized personal watercraft which is optimal for the load, speed and conditions desired. For the purposes of a motorized personal watercraft such as an electric kayak, it has been found that a typical 2 or 3 bladed trolling motor propeller is sufficient to suit the needs of the propulsion units described herein.

It is also advisable in some embodiments to configure either a temporary (e.g. inflatable) or permanent outrigger to stabilize the personal watercraft further. Such an example would be an outrigger which can be extended outward and inflated upon need and deflated and folded back into the hull when not in use.

As noted earlier, additional specifications, design/manufacturing considerations and operational details for embodiments of the present invention can be found within the content of the provisional applications as recited in the first paragraph of this technical disclosure.

CONCLUSION

The novel approaches described herein for a motorized personal watercraft provide several advantages over prior approaches. In the foregoing specification, the invention has been described as applicable to an electric kayak, where the special advantages of the described apparatus are very desirable. However, the same invention may be applied to other personal watercraft.

Unless otherwise indicated, all numbers expressing quantities used in the specification and claims are to be understood as being modified in all instances by the term "about" or "approximately." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. An electrically powered kayak having an intended forward direction of travel, the kayak comprising:
   a seat formed in a cavity defined by a hull of the kayak;
   a propulsion unit cavity defined by the hull of the kayak, wherein the propulsion unit cavity is separate from the cavity with the seat, and wherein the propulsion unit cavity is formed forward of the seat with respect to the intended direction of travel;
   a retractable propulsion unit capable of being retracted into the propulsion unit cavity, the retractable propulsion unit comprising an assembly for steering control, a motor providing force to a propeller, and a shaft coupling the motor to the assembly, wherein the retractable propulsion unit can be steered by the assembly;
   one or more of a pivot point between the assembly and the motor, thereby allowing the motor to substantially retract into the cavity, and a shaft allowing the motor to be slidably extended for operation or retracted into the propulsion unit cavity for stowing;
   one or more of an electromagnet and a linear motion solenoid configured to selectively lock the motor into extended and fully retracted positions; and
   wherein the motor and the propeller substantially occupy the cavity in the fully retracted position.

2. The electrically powered kayak of claim 1, wherein the retractable propulsion unit is capable of retracting into the cavity by its own propulsion.

3. The electrically powered kayak of claim 1, wherein the retractable propulsion unit retracts into the cavity by powered means.

4. The electrically powered kayak of claim 1, further comprising of one or more plates to substantially cover the cavity when the propulsion unit is in a fully retracted position.

5. The electrically powered kayak of claim 1, wherein the retractable propulsion unit comprises a pull-style motor.

6. The electrically powered kayak of claim 1, wherein the retractable propulsion unit comprises a push-style motor.

7. The electrically powered kayak of claim 1, wherein the voltage for a motor for the retractable propulsion unit is one or more of: 12 volts, 24 volts, 36 volts, 48 volts.

8. The electrically powered kayak of claim 1, wherein the motor, driveshaft and propeller can be rotated as a whole such that the driveshaft and the propeller retract into the cavity.

9. The electrically powered kayak of claim 1, wherein the retractable propulsion unit is a sliding propulsion unit comprising of a motor and a shaft, wherein the shaft can be vertically manipulated thereby allowing the motor to be extended for operation or retracted into the cavity for stowing.

10. The electrically powered kayak of claim 1, wherein the retractable propulsion unit is powered by one or more batteries.

11. The electrically powered kayak of claim 10, wherein the one or more batteries are one or more from the set comprising: alkaline batteries, lead acid batteries, nickel-cadmium batteries, nickel metal hydride batteries and lithium batteries.

12. The electrically powered kayak of claim 1, further comprising one or more plates to substantially cover the cavity when the propulsion unit is in an extended, operating position.

13. The electrically powered kayak of claim 12, wherein the one or more plates are affixed to the propulsion unit above the propeller.

14. An electrically powered kayak having an intended forward direction of travel, the kayak comprising:
   a seat formed in a cavity defined by a hull of the kayak;
   a propulsion unit cavity defined by the hull of the kayak, wherein the propulsion unit cavity is separate from the cavity with the seat, and wherein the propulsion unit cavity is formed forward of the seat with respect to the intended direction of travel;
   a steerable retractable propulsion unit comprising of a motor, a driveshaft and a propeller, wherein the driveshaft transfers force from the motor to the propeller;
   a plurality of batteries coupled to the propulsion unit, wherein the batteries are distributed between multiple locations within the cavity with the seat;
   a pivot point between the motor and the propeller, thereby allowing the driveshaft and the propeller to substantially retract into the cavity;
   wherein the propulsion unit can be selectively locked into an extended position;
   wherein the propulsion unit can be selectively locked into a fully retracted position; and
   wherein the driveshaft and the propeller substantially occupy the cavity in the fully retracted position.

15. The electrically powered kayak of claim 14, wherein the retractable propulsion unit is capable of being selectively locked into or unlocked from its fully retracted position by using one or more devices from the set comprising: a pin, an electromagnet, a solenoid, a cable, a set of gears, a linear actuator, and a hydraulic mechanism.

16. The electrically powered kayak of claim 14, wherein the retractable propulsion unit is capable of being selectively locked into or unlocked from its extended position by using one or more devices from the set comprising: a pin, an electromagnet, a solenoid, a cable, a set of gears, a linear actuator, and a hydraulic mechanism.

17. The electrically powered kayak of claim 14, wherein the retractable propulsion unit further comprises a plate under the propeller, such that the plate substantially covers the cavity when the propulsion unit is in a fully retracted position.

18. The electrically powered kayak of claim 14, further comprising:
   a retractable steering unit for steering the kayak, wherein the retractable steering unit is selectively coupled to the retractable propulsion unit.

19. The electrically powered kayak of claim 14, wherein the steerable retractable propulsion unit can be disengaged such that it cannot be steered when in a fully retracted position.

20. The electrically powered kayak of claim 14, further comprising a rudder coupled to the driveshaft.

21. The electrically powered kayak of claim 14, wherein at least one of the battery locations is under the seat.

* * * * *